United States Patent
Dubyak et al.

(10) Patent No.: US 10,803,255 B2
(45) Date of Patent: *Oct. 13, 2020

(54) FORMULATING A RESPONSE TO A NATURAL LANGUAGE QUERY BASED ON USER INTENT

(71) Applicant: International Business Machines Corporation, Armonk, NY (US)

(72) Inventors: William G. Dubyak, Severna Park, MD (US); Vijai Gandikota, Austin, TX (US); Palani Sakthi, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/912,466

(22) Filed: Mar. 5, 2018

(65) Prior Publication Data
US 2019/0272328 A1    Sep. 5, 2019

(51) Int. Cl.
*G06F 40/40*    (2020.01)
*G06F 16/35*    (2019.01)
*G06F 16/335*   (2019.01)
*G06F 16/9535*  (2019.01)
*G06F 16/9032*  (2019.01)

(52) U.S. Cl.
CPC ............ *G06F 40/40* (2020.01); *G06F 16/337* (2019.01); *G06F 16/35* (2019.01); *G06F 16/90332* (2019.01); *G06F 16/9535* (2019.01)

(58) Field of Classification Search
CPC .. G06F 16/24; G06F 16/3331; G06F 17/2785; G06F 16/3344

USPC ........................................................ 704/275
See application file for complete search history.

(56) References Cited

U.S. PATENT DOCUMENTS

| | | | |
|---|---|---|---|
| 9,336,388 B2 | 5/2016 | Brdiczka et al. | |
| 9,589,245 B2 | 3/2017 | Coden et al. | |
| 9,591,008 B2 | 3/2017 | Shulman et al. | |
| 2010/0269175 A1 | 10/2010 | Stolfo et al. | |

(Continued)

OTHER PUBLICATIONS

Chari, Suresh, et al., "A platform and analytics for usage and entitlement analytics", IBM J. Research. & Development, v. 60, n. 4, paper 7 (2016).

(Continued)

*Primary Examiner* — Bharatkumar S Shah
(74) *Attorney, Agent, or Firm* — Diana R. Gerhardt; Jack V. Musgrove

(57) ABSTRACT

Natural language processing is enhanced by linguistically extracting intelligence about a user. A history of user queries is analyzed by a natural language classifier to determine various user intents, and these intents are combined to form a user intent profile. The profile includes elements of sentiment, emotion and tone. The profile can be used in various ways including restricting access to documents in a collection, or refining a cognitive analysis of a query. For access restriction, a determination is made that the user intent is inconsistent with a document, and the user is denied access to the document. This determination involves a user intent score which is compared to a score of the document. For cognitive analysis, searching of reference documents is filtered by excluding documents based on the user intent. The searching includes a comparison of meta-data tags of the documents to the user intent.

20 Claims, 5 Drawing Sheets

(56) References Cited

U.S. PATENT DOCUMENTS

| 2015/0099257 A1* | 4/2015 | Kozloski | G06F 16/337 |
| | | | 434/362 |
| 2015/0234920 A1* | 8/2015 | Tawfik | G06F 16/9535 |
| | | | 707/724 |
| 2016/0004862 A1 | 1/2016 | Almehmadi et al. | |

OTHER PUBLICATIONS

Goharian, Nazli, et al., "DOTS: Detection of Off-Topic Search via Result Clustering," IEEE Intelligence and Security Informatics, p. 145-151 (2007).

Santos Jr., Eugene, et al., "Intent-Driven Insider Threat Detection in Intelligence Analyses," IEEE/WIC/ACM Int'l. Conf. on Web Intelligence and Intelligent Agent Technology, v. 2, pp. 345-349 (2008).

Symonenko, Svetlana, et al., "Semantic Analysis for Monitoring Insider Threats", Syracuse University School of Information Studies Faculty Scholarship, paper 59 (2004).

Yilmazel, Ozgur, et al., "Leveraging One-Class SVM and Semantic Analysis to Detect Anomalous Content," Int'l. Conf. on Intelligence and Security Informatics, p. 381-388 (2005).

\* cited by examiner

FORMULATING A RESPONSE TO A NATURAL LANGUAGE QUERY BASED ON USER INTENT

CROSS-REFERENCE TO RELATED APPLICATION

This application is related to U.S. patent application Ser. No. 15/912,430 entitled "LEVERAGING NATURAL LANGUAGE PROCESSING TO REFINE ACCESS CONTROL WITHIN COLLECTIONS" filed Mar. 5, 2018, which is hereby incorporated.

BACKGROUND OF THE INVENTION

Field of the Invention

The present invention generally relates to natural language processing and cognitive systems, and more particularly to a method of responding to a natural language request based on perceived intentions of the requestor.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and cognitive systems such as the Watson™ cognitive technology marketed by International Business Machines Corp.

Text analysis is known in the art pertaining to NLP and typically uses a text annotator program to search text documents (corpora) and analyze them relative to a defined set of tags. The text annotator can generate linguistic annotations within the document to tag concepts and entities that might be buried in the text. A cognitive system can then use a set of linguistic, statistical and machine-learning techniques to analyze the annotated text, and extract key business information such as person, location, organization, and particular objects (e.g., vehicles), or identify positive and negative sentiment. The Watson system relies on hypothesis generation and evaluation to rapidly parse relevant evidence and evaluate potential responses from disparate data. End users can pose certain questions in a natural language for which the system responds with a procedural answer (with associated evidence and confidence).

Natural language classifiers are commonly used in NLP systems to identify the type of discourse in connected text, e.g., a yes/no question, a content question, a statement, an assertion, etc. This service enables developers without a background in machine learning or statistical algorithms to create natural language interfaces for their applications. A natural language classifier (NLC) interprets text and returns a corresponding classification with associated confidence levels. The return value can then be used to trigger a corresponding action, such as redirecting the request or answering a question. NLCs are typically tuned and tailored to short text (1000 characters or less) and can be trained to function in any domain or application. For example, the IBM Watson™ natural language classifier service applies deep learning techniques to make predictions about the best predefined classes for short sentences or phrases. Exemplary applications include responding to questions from users that would otherwise be handled by a live agent, categorizing text messages (SMS) as personal, work, or promotional, classifying tweets into a sets such as events, news, or opinions, and analyzing text from social media or other sources to determine whether it relates positively or negatively to an offering or service.

SUMMARY OF THE INVENTION

The present invention in at least one embodiment is generally directed to a method of responding to a natural language query by receiving the natural language query from a user in computer readable form, receiving a user profile associated with the user wherein the user profile has an indication of user intent which includes one or more of sentiment, emotion and tone, performing cognitive analysis on the natural language query based on the user intent using a reference collection having one or more documents to yield a response to the query, and presenting the response to the user. A natural language classifier can be used to determine a current user intent from the natural language query, and the user profile can be updated with the current user intent. For new users, the user profile can be a default profile having a predetermined set of intents. The cognitive analysis can include searching a subset of the documents wherein the subset excludes at least one of the documents based on the user intent. The searching can further includes a comparison of meta-data tags of the documents to the user intent. The user intent can also based in part on a scope of responsibilities of the user. In a preferred implementation the user profile includes multiple intent elements sentiment elements, emotion elements and tone elements.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
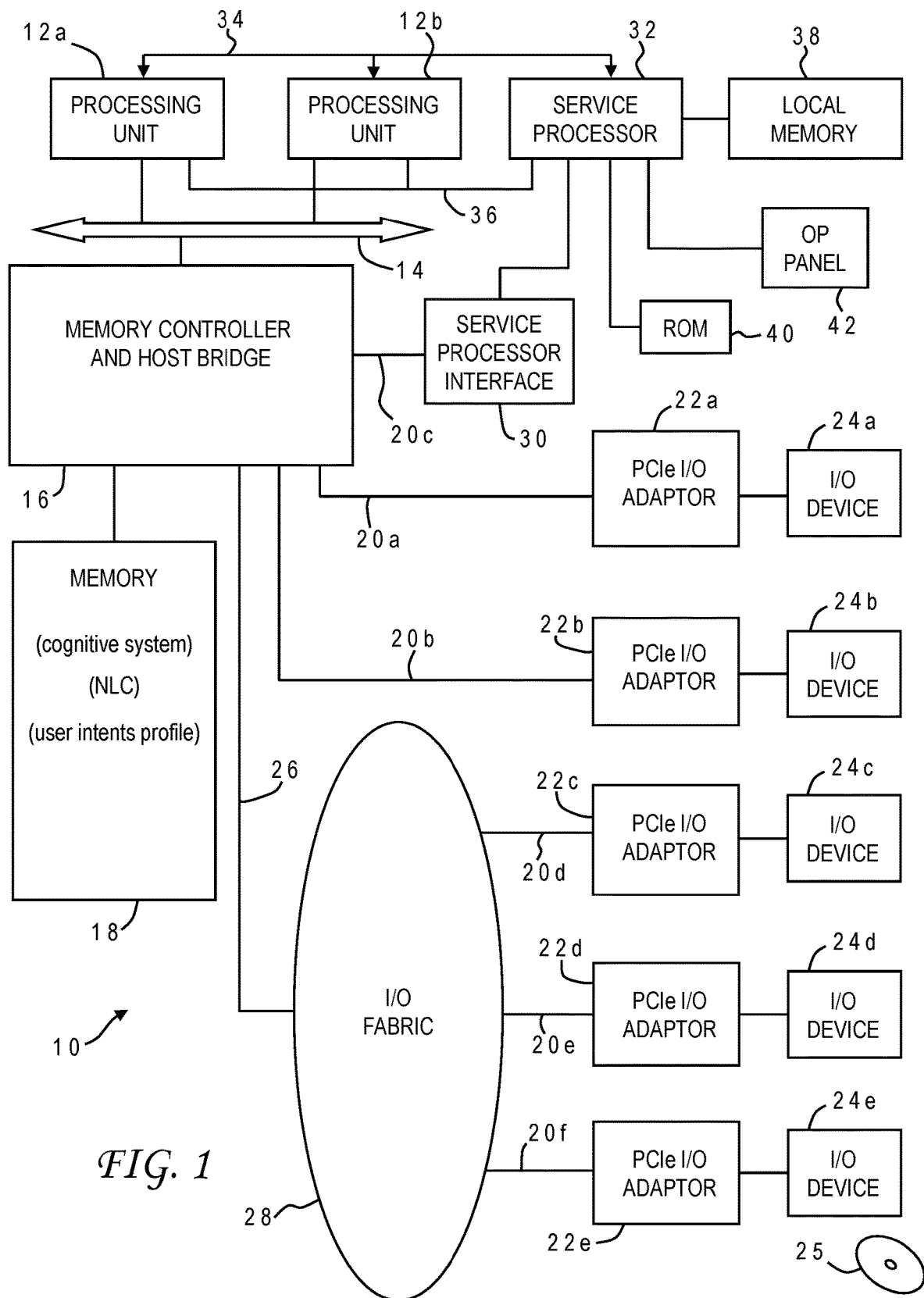
FIG. 1 is a block diagram of a computer system programmed to carry out natural language processing with access control in accordance with one implementation of the present invention.

Organizations have at their disposal sophisticated methods in natural language processing (NLP) to enable access to unstructured text documents and sensitive applications/systems. Most of these methods are designed for extraction of actionable information, such as question answering or aggregation of all information contained about a particular entity. However, there is currently no effective way to filter user interaction with the corpus/system based on customer intention. A user carries a set of latent preferences and intentions that govern her interests and behavior in the way she approaches a search. Conventional approaches to NLP disregard these preferences. It would, therefore, be desirable to devise an improved method of NLP which could develop deeper insight into customer intention. It would be further advantageous if the method could also be used to detect risky user intention.

The present invention achieves these and other objects by examining a user's choice of language to build a profile of that user's latent intentions. The user profile can be augmented by indicators of the nature of material in the scope of his responsibilities, or in the historical record of previous searches. Changes in indicated user intent then become detectable, and can be leveraged to preclude access to sensitive materials. The insights derived by this profile can be applied for two discrete purposes: appropriateness and access.

With regard to appropriateness, in a select class of organization there is a need to monitor users who have been entrusted with access to highly sensitive information. The present invention provides the capacity of the system to detect shifts in user sentiment that suggest a possible need for intervention. For example, the present invention can protect an organization against a trusted member of a team who is on a trajectory towards nefarious or unexpected reckless behavior. If the system detects a shift in user behavior or emotional stability, it can generate a cueing mechanism to suggest when monitoring may be appropriate or, if necessary, instigate an alert to people within an organization charged with protection of sensitive information.

With regard to access, currently user access to a document or system is regulated by organization, role, or special qualification (such as a security clearance). This approach is workable but is very limited in its Boolean nature. The present invention expands beyond such yes/no systems to examine, classify and leverage the language used by a particular user of the organization's system to help refine a sense of legitimate scope of responsibility and need for particular documents/access. The present invention is designed to add a more nuanced application of security access to a user profile in order to more carefully regulate the manner in which information is revealed to users of the system. This approach enhances security as user access to particular documents could be restricted based on NLP-derived understanding of the limits of the user's roles and responsibilities.

With reference now to the figures, and in particular with reference to FIG. 1, there is depicted one embodiment 10 of a computer system in which the present invention may be implemented to carry out natural language processing including detecting and leveraging user intent. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 may have loaded therein a cognitive system and one or more applications in accordance with the present invention such as a natural language classifier (NLC) and user intents profile generator.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the user intent profile generation application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a NLP application that uses novel interpretive techniques to manage access to documents/systems. Accordingly, a program embodying the invention may additionally include conventional aspects of various NLP tools, and these details will become apparent to those skilled in the art upon reference to this disclosure.

Figure 2:
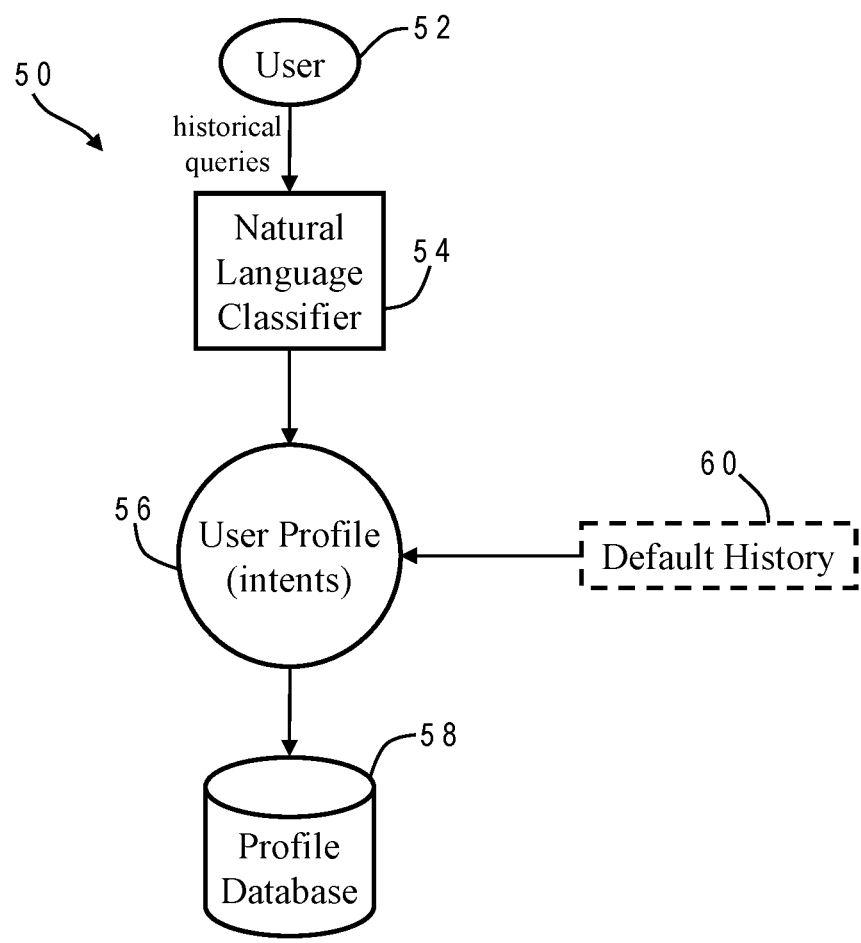
FIG. 2 is a pictorial representation illustrating the construction of a profile for a user providing user intents based on historical queries in accordance with one implementation of the present invention.

Referring now to FIG. 2, there is depicted a system 50 for generating a user intents profile in accordance with one implementation of the present invention. A user 52, who may be practically anyone including without limitation an employee of an organization, a customer, or just a private individual (or even an automated entity such as a virtual assistant), makes a series of queries in natural language to a cognitive system over a period of time. These historical queries may be processed as they are issued by user 52, or may be collected for later batch processing. The term "query" as used herein is not intended to be limited to words that form a question per se, but rather covers any type of sentence, sentence fragment, or collection of fragments. A query could even be as simple as a single word, for example, when someone wants a definition for that word. The historical queries are analyzed by a natural language classifier (NLC) 54 adapted to distinguish various potential user intents, i.e., subtexts or underlying themes. In the illustrative implementation, these intents include each of sentiment, emotion and tone which are considered separate and distinct as used herein (alternative implementations may use less than all three of these varieties, or may use additional metrics of intent such as attitude or personality). The intents deciphered from the compilation of these historical queries are combined to form the user profile 56, which may be added to a profile database 58 having multiple profiles for different users of a cognitive system. User profile 56 may be continually updated as the user issues new queries to the system by subjecting the new queries to NLC 54 and adding any newly discovered intents.

A user profile can begin empty, i.e., a null set of intents, but more preferably a new user can start with a default profile 60 having safety restrictions in place, e.g., based on a predetermined set of intents or history considered neutral (unaligned), or possibly even with suspect intents, depending upon the system designer. These restrictions can be released as the user's history becomes more robust, and the intent profile becomes more complete. Alternatively, elite users may be given more beneficent intents as a default. For example, a new employee who is in a security position and has already been cleared for a higher access level can be given a default profile indicative of her trustworthiness by including elements of sentiment, emotion and/or tone deemed highly responsible. The exact mapping of these elements to perceived risk or safety will generally be in accord with common sense but may be subject to designer nuances. In one implementation this mapping is achieved by making these elements components of the user intent score discussed further below.

Figure 3:
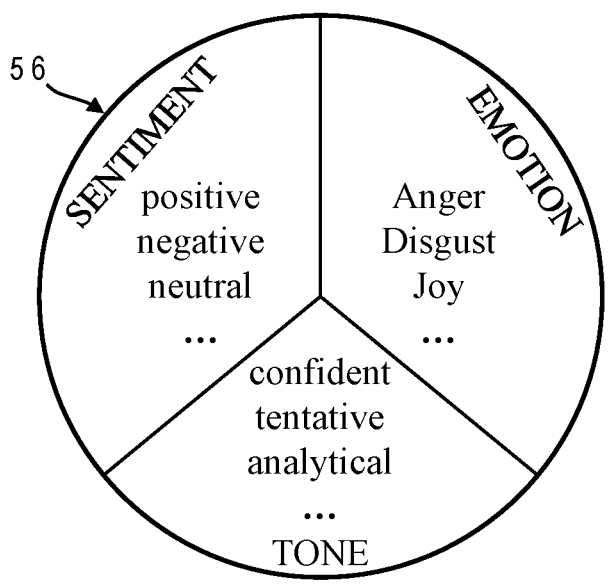
FIG. 3 is a graphic image of a generic user profile having different user intents including sentiment, emotion and tone in accordance with one implementation of the present invention.

FIG. 3 shows a generic user profile 56 having different user intents including sentiment, emotion and tone in accordance with one implementation of the present invention. Sentiment can generally be thought of as positive or negative, or somewhere in between (neutral). There may be finer gradations or particularly contexts for sentiment, such as satisfied or dissatisfied. Emotions are more instinctive in nature and might include things like anger, disgust, joy, arousal or depression. Tone is the general character of a query. Whereas emotion is an inner state of a person, tone is more external, how people choose to express their emotions to have an intended effect on their target audience. Different tones might include analytical, confident, coercive, formal, and friendly. These examples of specific sentiment, emotion and tone are exemplary only, and should not be construed in a limited sense, as each of these intent classes (or others) may include a wide variety of feelings and thoughts, both positive and negative.

As the user makes more queries and the profile is built up, different elements of intent will be reinforced or negated, resulting in a composite intent unique to the user. As the profile grows, old intents can be removed or a lesser weighting can be applied to them. Having such a "standard" profile of the user makes it easy to detect any shift in intent by recognizing any major discrepancies in the constituent elements of the profile.

Figure 4:
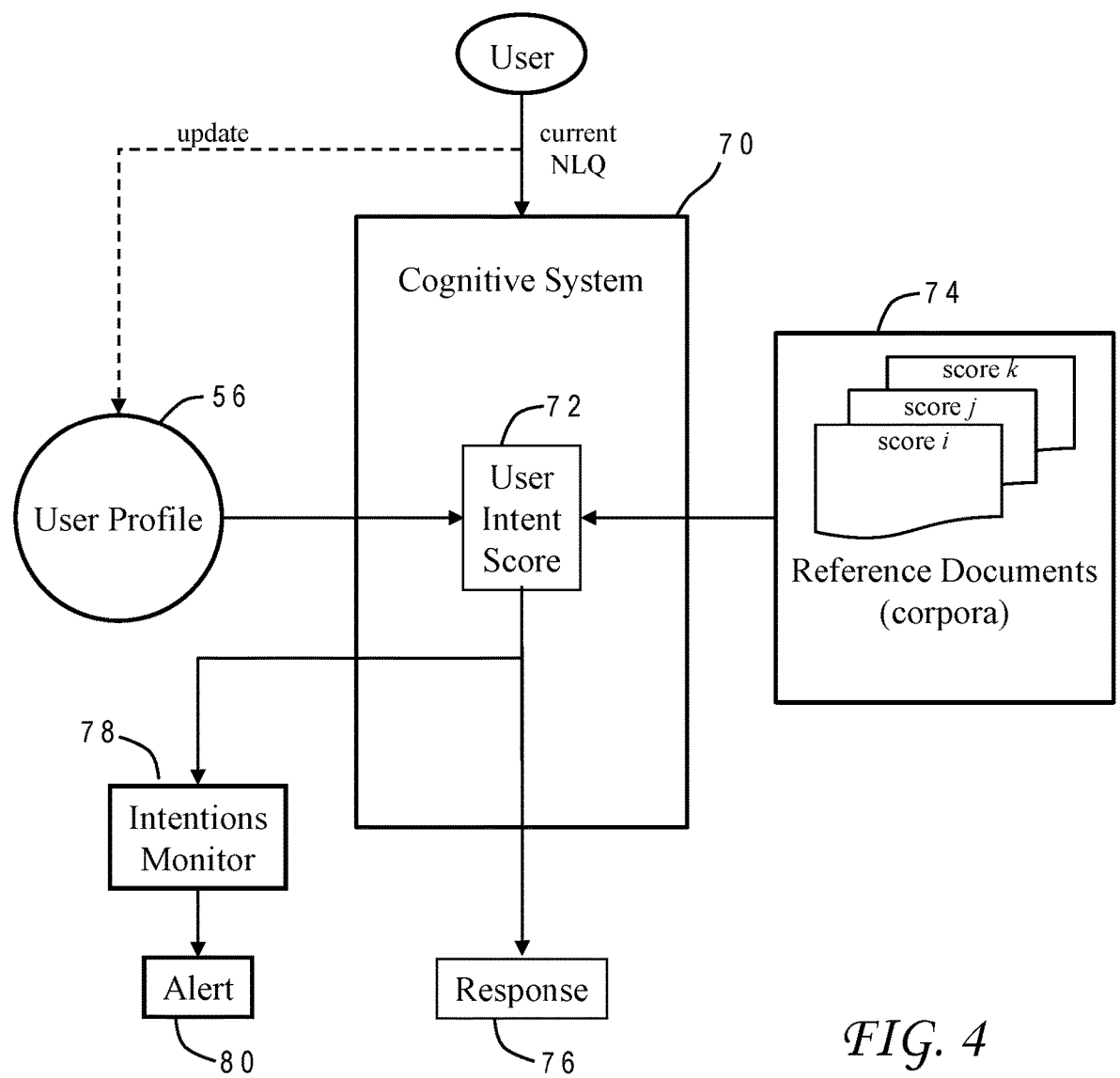
FIG. 4 is a high-level block diagram of a cognitive system which uses the user profile of FIG. 3 to generate a user intent score which can be compared to respective scores for reference documents to refine access control to the documents and provide a response to a natural language query based on user intent in accordance with one implementation of the present invention.

With further reference to FIG. 4, one embodiment of a cognitive system 70 is illustrated which can leverage the user profile 56 of FIG. 3 to generate a user intent score 72 which is compared to respective scores for reference documents 74 to refine access control to the documents and provide an enhanced response 76 to a current natural language query (NLQ) based on user intent. Cognitive system 70 may run on computer system 10. Cognitive system 70 may utilize different scoring algorithms to render a numerical value from user profile 56 reflecting the perceived overall intention of the user. As noted above, the specific mapping of intents to a score may vary according to design and/or particular circumstances. For purposes of this invention, user intent at any point in time can be considered a way to measure the risk of that user going bad. The intent score will not necessarily be definitive; it is a safety control to temporarily restrict access and flag a user for review. Implementation of a predictive algorithm is conditional on two assumptions. First, there is a unique way to identify the results of the classification of a user's interaction with the system. It is the process of measuring the user that enables NLP driven protections of this system. Second, it is assumed that the ultimate manifestation of this invention will allow system owners to modify the machine learning models (for example, by integrating other types of data) so they can refine the predictive power.

In all cases, the algorithm depends on a series of measurements or indictors as depicted in FIG. 3. In the illustrative implementation, the user is evaluated in three dimensions: Sentiment, Tone, and Emotions. The user can receive three scores for each interaction, one in each segment of the circle. Scoring can be normalized so the most positive rankings are near the origin; as user scores become more negative evaluation moves away from the origin. Additionally, score intensity increases as the marking migrates in a clockwise direction within the region. (Recognize that each segment is 120 degrees, so two points separated by mostleast intense will vary in azimuth by a maximum of 120 degrees). Accordingly, negativity in each of three segments is measured by azimuth (0-120 degrees within each segment) and distance from origin. Any given point is uniquely identified by these two measurements.

Calculating static (at a specific point in time) user intent is a basic classification task; there are two good approaches to solving assignment to category 'potentially problematic'. One approach is based on Supervised Machine Learning methods. It is very sophisticated, and reliable, but requires a considerable amount of complete cases (known outcomes) to train machine learning models. An alternative method leverages methods in anomaly detection to automatically flag unusual cases for examination. This method, although simple, requires assumptions, and lacks the flexibility of the Machine Learning methodology.

A more complex approach uses logistic regression to calculate $P(Y=1)$; that is, the probability that a user is assigned to the category of 'potentially problematic'. Logistic regression is a robust, powerful, classification technique in use throughout industry and academia. It leverages a series of factors (inputs) to calculate an intermediate statistical product easily and automatically converted to a probability. User probability after a particular interaction is compared to a configurable threshold. If the user score exceeds a document threshold access is denied.

Implementation of this algorithm requires sufficient cases where the outcome is known (person declared a potential problem), with corresponding scores for specific user interaction. For example, assume a user interaction is manually evaluated as a problem, where possible choices are "problem/not problem". Also assume the interaction has a value for each feature to be included in the model (measurements from NLP evaluation, plus anything else system owners have elected to include). Complete cases are training data for models; when a machine learning model has seen enough complete cases, it recognizes the linear combination of features most predictive of a 'positive' outcome, where 'positive' means presence of the predicted condition. In our use case 'positive' is actually a negative outcome; the language is statistical, not substantive. Machine learning methods are flexible relative to rules-based expert systems. They discriminate between cases based on combinations of features, and their intermediate products can be converted to something more easily interpreted by human readers. System owners choosing this more complex method should experiment as they learn more about their problem, and become aware of other indicators to help identify potential problems.

A second, less complex, mechanism is a simple combination of the scores within each section of the circle in FIG. 3. Recall that for user response a larger score is farther from origin, indicating a more negative system evaluation. A higher azimuth score (in the range 0-120) indicates a system evaluation of greater intensity.

In this invention particular thresholds are configurable by the system owner on the basis of risk tolerance and domain knowledge; it would be a mistake to make universal and arbitrary thresholds because no two situations are identical. Owners will set thresholds in each of three segments at which a user would be denied access, but also have the option of adjusting a threshold based on intensity. For example, a user displaying negative sentiment, but mildly, could be permitted access. A user with much more intense feelings of anger could be denied at a lower distance from origin. Owners could also derive some simple formula (such as an average of the three segment scores) if that was a better fit for their use case.

This second mechanism is considerably easier to implement, but at a cost of a less sophisticated integration of all available information. It also uses an arbitrary threshold for a raw quantity rather than a linear combination of inputs, and lacks a simple transformation to a readily interpretable quantity.

Each document may be similarly scored to provide a relative indication of what intentions or level of access is required for a particular document. Scoring of documents may be similar to scoring of user intents, or may be done manually, e.g., by subject matter experts. Thus, a user may have an associated intent score which allows access to certain documents in the reference collection, but precludes access to other documents in the collection; in this implementation, a document with a score higher than the user intent score is never discovered by cognitive system 70 as part of its searching. In an alternative implementation cognitive system may examine all of the documents in the collection to produce candidate responses the query, but then redact any candidate responses which were derived from a restricted document, i.e., one whose score is not met by the user intent score. The current natural language query can also be used to update the user profile. In a further alternative implementation, a user intent score which is lower than a predetermined threshold will preclude access to any documents.

If a trend in user intent indicates a downward trajectory, i.e., moving from helpful or benign intents to suspicious or malicious intents, then a monitor 78 can trigger an alert and user access can be restricted while the case is flagged for review. Intentions monitor 78 can perform a one-time comparison of the latest perceived intent from the current natural language query to the intents from the user profile, or can monitor changes in intent over time. While intentions monitor 78 is shown in FIG. 4 as a feature separate from cognitive system, it may be incorporated into the cognitive system in some embodiments.

Insider threat is often a function of a change in life circumstances in a person who was once trusted and reliable. Detecting significant change is a major step in enhancing the ability to reduce risk to sensitive information. Indication of a steady decline in the attitude of a trusted insider is far more important than a static measurement. Everyone has a bad day; it is systematic change in a person's perspective that elevates the importance of access control.

One application of the foregoing algorithms follows the form of anomaly detection theory, where change in an individual user is measured relative to the appropriate peer group. Each user has a profile. Each interaction has a user intent score; the profile is updated with the user's average intent score, and a measure of trend in the user intent score. The idea of detecting actionable change is to automatically detect patterns of behavior that over time, do not conform to expected patterns within a user population. They are outliers; in some dimension they do not fit expectations. This can be implemented in a number of different ways such as: (i) a negative trend in a key dimension exceeding the average trend by a configurable amount (depending on population size this threshold may be standardized or absolute); (ii) visually detecting trends—if a user is deviating in trend, it can be visually reported to system owners relative to population average; and (iii) using an industry standard, such as a denying access to sensitive data when user trend is more than two standard deviation from the population trend. Access denial under these circumstances may be temporary; the central value of this service is to flag a troublesome trend for human inspection and intervention.

Figure 5:
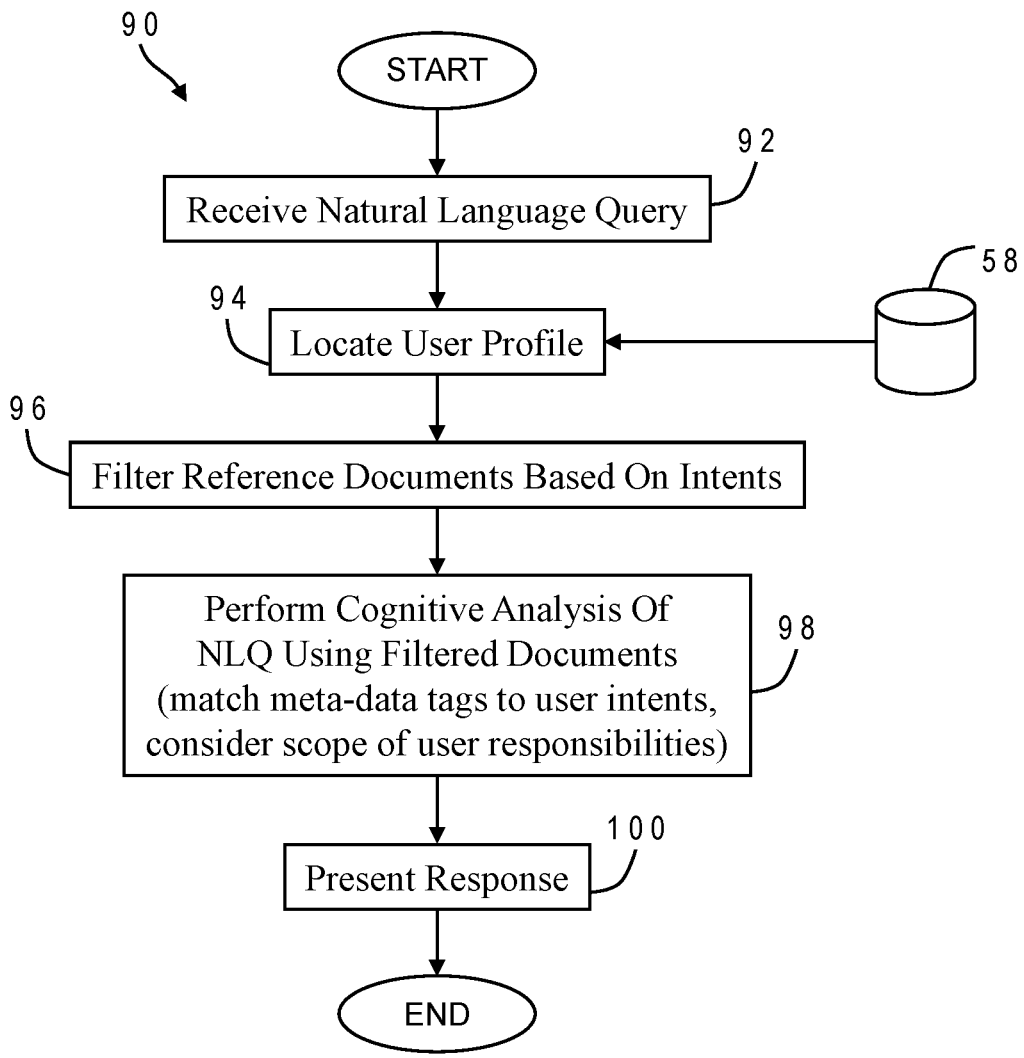
FIG. 5 is a chart illustrating the logical flow for a process of responding to a natural language query based on user intent in accordance with one implementation of the present invention.

The present invention may be further understood with reference to FIG. 5 which shows a chart for the logical flow of a process 90 for responding to a natural language query based on user intent in accordance with one implementation of the present invention. Process 90, which may be carried out using computer system 10, begins with receipt of the natural language query from a user known to the system (92). That user has a corresponding profile in profile database 58, and the system can search that database to locate the user's profile (94). Reference documents (corpora) can be filtered before the cognitive analysis begins, e.g., blocking any documents whose scores are higher that the user's intent score (96). The system performs cognitive analysis on the remaining documents to find the best matching candidate answers to the user's query (98). This analysis can include attempting to match meta-data tags of the documents to user intents, as well as taking into consideration the scope of the user's responsibilities which have been entered into the system previously. The results of the filtered cognitive analysis can then be presented to the user as a response (100).

Most NLP systems integrate a search phase and a processing phase; the search phase selects a subset of corpus documents for the processing phase. If a document is not discovered in search, it is never be exposed to processing. This is both an asset and a liability to an NLP system. It has a negative impact if a search query causes a key document to be missed in the search phase. But this distinct separation of phases may also be exploited to enhance security in a system by 'blinding' a search to documents the user is not permitted to see. This precludes inadvertent compromise of information to which a user is not entitled.

There are many ways in which meta-data tags could match some user intents.

Search access can be regulated by tagging each document with metadata indicating among others: security classification level, organizational access restrictions, document level access restrictions, and administrative restrictions. Each user has a profile attached to her login; this profile contains her access limitations. For any document, only users meeting 100% of the restrictions may discover the document for the processing phase.

User intent score is a more flexible control device for system owners. As envisioned, owners may set thresholds on certain classes of their documents. For example, certain highly sensitive documents, with potential to cause considerable harm if mishandled in some way, can be labeled with a tag to restrict access to anyone whose intent score is above a certain threshold. In more elaborate schemes, there may be several different classes, with correspondingly more rigorous screening criteria. These thresholds can be left to the discretion of individual system owners as an additional layer of security. It is expected they will be adjusted over time.

Figure 6:
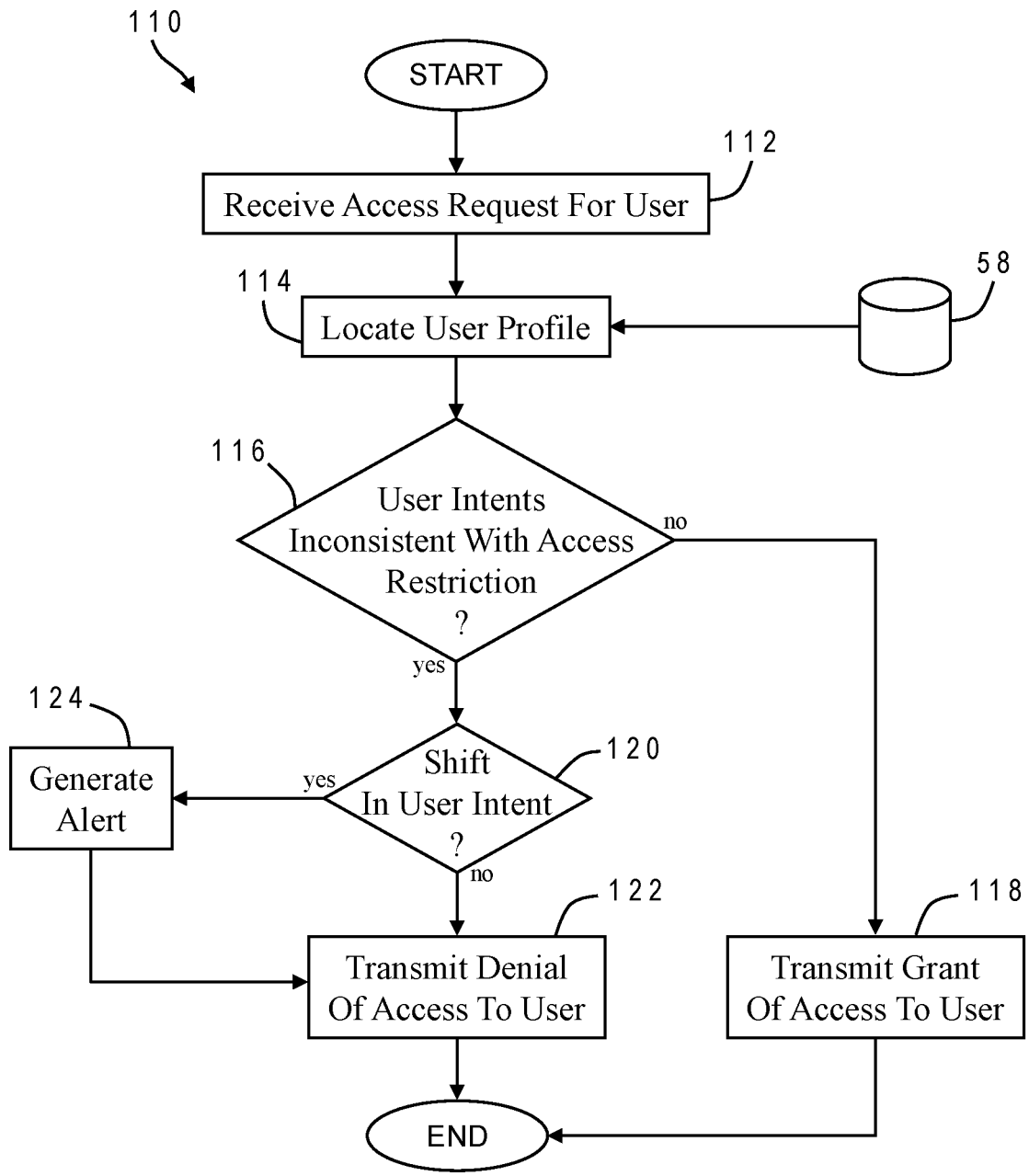
FIG. 6 is a chart illustrating the logical flow for a process of restricting access to documents and possibly generating an alert based on user intent in accordance with one implementation of the present invention.

FIG. 6 is a chart illustrating the logical flow of an alternative process 110 for restricting access to documents and possibly generating an alert based on user intent in accordance with one implementation of the present invention. As with process 90, process 110 may be carried out using computer system 10. Process 110 begins when the system receives a request to access a resource of the system or of a connected system, such as one or more documents within a collection of documents (112). This request to access can be direct, e.g., trying to open a particular file whose existence and location within the system may already be known to the requestor, or indirect, e.g., a query that might, if otherwise unrestricted, use a particular document in a search for a response to the query. The system can again locate the user profile from a profile database (114), and examine the user intents from the profile to determine whether they are inconsistent with existing access restrictions for the document(s). If the user intents are compatible with a requested document, access is granted to the user (118). If not, the system can further examine whether there has been any recent shift in user intent (120). If no shift is detected, the system proceeds to transmit a denial of the request to the user without further action (122). If, however, the system detects a shift that appears risky, it can generate an alert to a supervisor or other security/enforcement entity (124).

The present invention thereby offers a new mechanism to enhance protection of sensitive material. The primary novelty of the invention lies in its use of linguistically-extracted intelligence about a user to regulate access to document. It is seen not as a stand-alone technique or as a replacement for existing methods, but rather it is an augmentation to more structured access management systems. The invention does not rely on basic text analytics such as keyword or phrase matching. Instead, it takes the user's personal language on the system as an indicator of intent to inform the system when the user is potentially at risk of departing from acceptable use of the material at her disposal. Other specific novelties of the invention include: (i) the creation of a class of user intents, which will be associated with a user profile based on that user's observed search behavior and choice of language; (ii) a mechanism for scoring user intents and adding them to the profile, and augmenting these intents with subject-specific entities and relationships; and (iiii) the use of this score to regulate user access to any desired part of the system. The immediate novelty is based on a generalizable foundation. While the implementations described herein limit application of the invention to the protection of sensitive information, there is no doubt that the same mechanism can be extended to such enhancements as using the intent profile to augment ranking algorithms to promote documents more likely to be of interest to the user. The present invention accordingly offers significant advantages over conventional cognitive systems, by adding nuance to the function of access management and leveraging information extracted by sophisticated NLP methods.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of responding to a natural language query comprising:
   receiving the natural language query from a user in computer readable form, by executing first instructions in a computer system;
   receiving a user profile associated with the user, the user profile having an indication of user intent which includes one or more of sentiment, emotion and tone, by executing second instructions in the computer system;
   performing cognitive analysis on the natural language query based on the user intent using a reference collection having one or more documents to yield a response to the query, by executing third instructions in the computer system; and
   presenting the response to the user, by executing fourth instructions in the computer system.

2. The method of claim 1 further comprising:
   using a natural language classifier to determine a current user intent from the natural language query; and
   updating the user profile with the current user intent.

3. The method of claim 1 wherein the user profile is a default profile having a predetermined set of intents.

4. The method of claim 1 wherein the cognitive analysis includes searching a subset of the documents, the subset excluding at least one of the documents based on the user intent.

5. The method of claim 1 wherein said searching includes a comparison of one or more meta-data tags of the documents to the user intent.

6. The method of claim 1 wherein the user intent is further based in part on a scope of responsibilities of the user.

7. The method of claim 1 wherein the user profile includes multiple intent elements including at least one sentiment element, at least one emotion element and at least one tone element.

8. A computer system comprising:
   one or more processors which process program instructions;
   a memory device connected to said one or more processors; and
   program instructions residing in said memory device for responding to a natural language query by receiving the natural language query from a user in computer readable form, receiving a user profile associated with the user wherein the user profile has an indication of user intent which includes one or more of sentiment, emotion and tone, performing cognitive analysis on the natural language query based on the user intent using a reference collection having one or more documents to yield a response to the query, and presenting the response to the user.

9. The computer system of claim 8 wherein said program instructions further use a natural language classifier to determine a current user intent from the natural language query, and update the user profile with the current user intent.

10. The computer system of claim 8 wherein the user profile is a default profile having a predetermined set of intents.

11. The computer system of claim 8 wherein the cognitive analysis includes searching a subset of the documents, the subset excluding at least one of the documents based on the user intent.

12. The computer system of claim 8 wherein the searching includes a comparison of one or more meta-data tags of the documents to the user intent.

13. The computer system of claim 8 wherein the user intent is further based in part on a scope of responsibilities of the user.

14. The computer system of claim 8 wherein the user profile includes multiple intent elements including at least one sentiment element, at least one emotion element and at least one tone element.

15. A computer program product comprising:
   a computer readable storage medium; and
   program instructions residing in said storage medium for responding to a natural language query by receiving the natural language query from a user in computer readable form, receiving a user profile associated with the user wherein the user profile has an indication of user intent which includes one or more of sentiment, emotion and tone, performing cognitive analysis on the natural language query based on the user intent using a reference collection having one or more documents to yield a response to the query, and presenting the response to the user.

16. The computer program product of claim 15 wherein said program instructions further use a natural language classifier to determine a current user intent from the natural language query, and update the user profile with the current user intent.

17. The computer program product of claim 15 wherein the user profile is a default profile having a predetermined set of intents.

18. The computer program product of claim 15 wherein the cognitive analysis includes searching a subset of the documents, the subset excluding at least one of the documents based on the user intent.

19. The computer program product of claim 15 wherein the searching includes a comparison of one or more meta-data tags of the documents to the user intent.

20. The computer program product of claim 15 wherein the user intent is further based in part on a scope of responsibilities of the user.

* * * * *